(12) United States Patent
Nair et al.

(10) Patent No.: US 9,350,603 B2
(45) Date of Patent: May 24, 2016

(54) DAISY CHAIN DISTRIBUTION IN DATA CENTERS

(71) Applicant: PayPal, Inc., San Jose, CA (US)

(72) Inventors: Aswani Kumar Raveendran Nair, Los Gatos, CA (US); Sergiy Pereshyvaylo, San Jose, CA (US); Bin Yu, San Ramon, CA (US); Sudheendra Vasudeva Murthy, San Jose, CA (US)

(73) Assignee: PayPal, Inc., San Jose, CA (US)

(*) Notice: Subject to any disclaimer, the term of this patent is extended or adjusted under 35 U.S.C. 154(b) by 0 days.

(21) Appl. No.: 14/746,582

(22) Filed: Jun. 22, 2015

(65) Prior Publication Data

US 2015/0286441 A1 Oct. 8, 2015

Related U.S. Application Data

(63) Continuation of application No. 13/754,618, filed on Jan. 30, 2013, now Pat. No. 9,065,810.

(51) Int. Cl.
| | | |
|---|---|---|
| *G06F 11/00* | (2006.01) | |
| *H04L 12/24* | (2006.01) | |
| *G06F 17/30* | (2006.01) | |
| *H04L 29/08* | (2006.01) | |
| *G06F 11/14* | (2006.01) | |
| *G06F 11/07* | (2006.01) | |

(52) U.S. Cl.
CPC ........ *H04L 41/0659* (2013.01); *G06F 11/0709* (2013.01); *G06F 11/1423* (2013.01); *G06F 17/30194* (2013.01); *H04L 67/06* (2013.01); *G06F 11/006* (2013.01); *G06F 11/0727* (2013.01); *G06F 11/0793* (2013.01); *H04L 67/1097* (2013.01)

(58) Field of Classification Search
CPC . G06F 11/0709; G06F 11/0727; G06F 11/20; H04L 41/0659
See application file for complete search history.

(56) References Cited

U.S. PATENT DOCUMENTS

| | | |
|---|---|---|
| 7,433,302 B2 | 10/2008 | Allen |
| 7,898,988 B2 | 3/2011 | Boatright et al. |
| 7,921,213 B1 | 4/2011 | Mcbreen et al. |
| 8,046,628 B2 | 10/2011 | Resnick |
| 8,819,170 B2 | 8/2014 | Cohen et al. |
| 9,065,810 B2 | 6/2015 | Nair et al. |
| 2007/0025240 A1 | 2/2007 | Snide |
| 2009/0138632 A1 | 5/2009 | Miura et al. |

(Continued)

OTHER PUBLICATIONS

"U.S. Appl. No. 13/754,618, Examiner Interview Summary mailed Nov. 18, 2014", 3 pgs.

(Continued)

*Primary Examiner* — Joseph Kudirka
(74) *Attorney, Agent, or Firm* — Schwegman Lundberg & Woessner, P.A.

(57) ABSTRACT

A method and a system to provide daisy chain distribution in data centers are provided. A node identification module identifies three or more data nodes of a plurality of data nodes. The identification of three or more data nodes indicates that the respective data nodes are to receive a copy of a data file. A connection creation module to, using one or more processors, create communication connections between the three or more data nodes. The communication connections form a daisy chain beginning at a seeder data node of the three or more data nodes and ending at a terminal data node of the three or more data nodes.

18 Claims, 7 Drawing Sheets

(56) References Cited

U.S. PATENT DOCUMENTS

| | | |
|---|---|---|
| 2010/0115326 A1 | 5/2010 | Westeroth |
| 2010/0135151 A1 | 6/2010 | Johnson et al. |
| 2010/0208621 A1 | 8/2010 | Morper |
| 2011/0016891 A1 | 1/2011 | Mcdonald et al. |
| 2011/0285516 A1 | 11/2011 | Ritter |
| 2011/0313973 A1 | 12/2011 | Srivas et al. |
| 2012/0130950 A1 | 5/2012 | Jain et al. |
| 2012/0278656 A1 | 11/2012 | Berkhahn et al. |
| 2014/0215257 A1 | 7/2014 | Nair et al. |

OTHER PUBLICATIONS

"U.S. Appl. No. 13/754,618, Non Final Office Action mailed Sep. 30, 2014", 25 pgs.

"U.S. Appl. No. 13/754,618, Notice of Allowance mailed Feb. 20, 2015", 10 pgs.

"U.S. Appl. No. 13/754,618, Response filed Jan. 6, 2015 to Non Final Office Action mailed Sep. 30, 2014", 9 pgs.

DAISY CHAIN DISTRIBUTION IN DATA CENTERS

RELATED APPLICATIONS

This application is a continuation of and claims the benefit of priority to U.S. patent application Ser. No. 13/754,618, filed on Jan. 30, 2013, which is hereby incorporated by reference herein in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012, All Rights Reserved.

TECHNICAL FIELD

The present application relates generally to the technical field of data management and, in one specific example, to daisy chain distribution of data files in data centers.

BACKGROUND

Data centers store large amounts of data across many different machines. Some machines store copies of data stored at other machines.

In the Apache Hadoop open-source software framework, data is distributed across several data nodes (e.g., a machine or virtual machine) in a Hadoop Distributed File System (HDFS). HDFS is a distributed, scalable, and portable filesystem written in Java for the Hadoop framework. In HDFS, various portions and copies of the data may be stored at the several data nodes. FIG. 1 depicts an environment 100 comprising a HDFS 102. The HDFS 102 has a data file that is stored in a seeder data node 104. The seeder data node 104 may distribute the data file, in whole or in part, to one or more leech data nodes such as data node A 106, data node B 108, data node C 110, additional data nodes (not shown), and/or data node N 112. The file may be distributed using a protocol such as the BitTorrent protocol or the hypertext transfer protocol (HTTP).

BRIEF DESCRIPTION OF THE DRAWINGS

Some embodiments are illustrated by way of example and not limitation in the figures of the accompanying drawings in which.

DETAILED DESCRIPTION

Example methods and systems to distribute data files in a data center using a daisy chain technique are described. In the following description, for purposes of explanation, numerous specific details are set forth in order to provide a thorough understanding of example embodiments. It will be evident, however, to one skilled in the art that the present invention may be practiced without these specific details.

Instead of distributing files in a HDFS data center using the BitTorrent or HTTP protocols, a daisy chain technique is provided. The daisy chain technique may allow larger files to be transferred to the data nodes faster than other techniques. To implement the daisy chain technique, multiple Transmission Control Protocol (TCP) connections are set up in the form of a serial chain, starting at a seeder node and including each end node to receive the file. The file is then streamed sequentially, one block at a time, from each data node to the next data node in the chain. During transmission, each data node acts as a T-junction, simultaneously saving the next block to disk and forwarding the previous block to the next data node in the chain.

If a data node in the chain fails during the transfer, the data node preceding the failed data node initiates the recovery process by generating a TCP connection with the data node subsequent to the failed data node. A handshake protocol is used to determine which blocks the subsequent data node in the chain has or has not yet received. The preceding node re-transmits the missing blocks to the subsequent node and resumes the transmission. The failed data node, when it is back online, may re-join the chain at the last position in the chain.

While the systems and methods are described in the context of an HDFS system, it is understood that the daisy chain distribution protocol may be used in other file distribution and management contexts. In some specific instances, the daisy chain distribution protocol may be used in an HDFS system or another kind of system to distribute index files across multiple resources or to distribute operating system (OS) images at provisioning.

Figure 1:
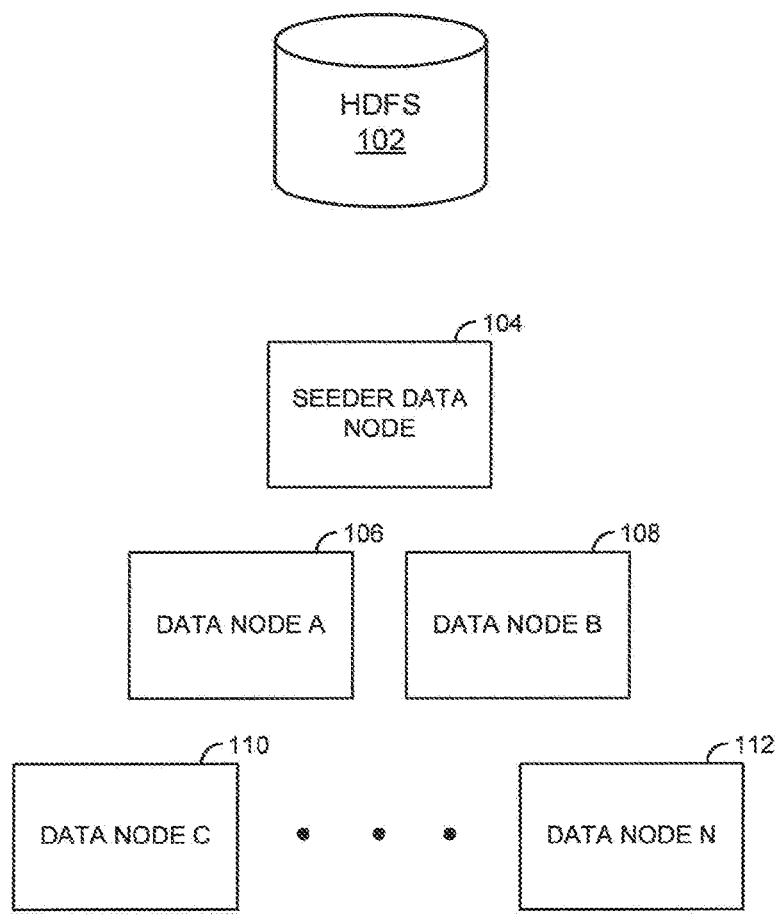
FIG. 1 depicts an environment in which the prior art may be practiced.
Figure 2:
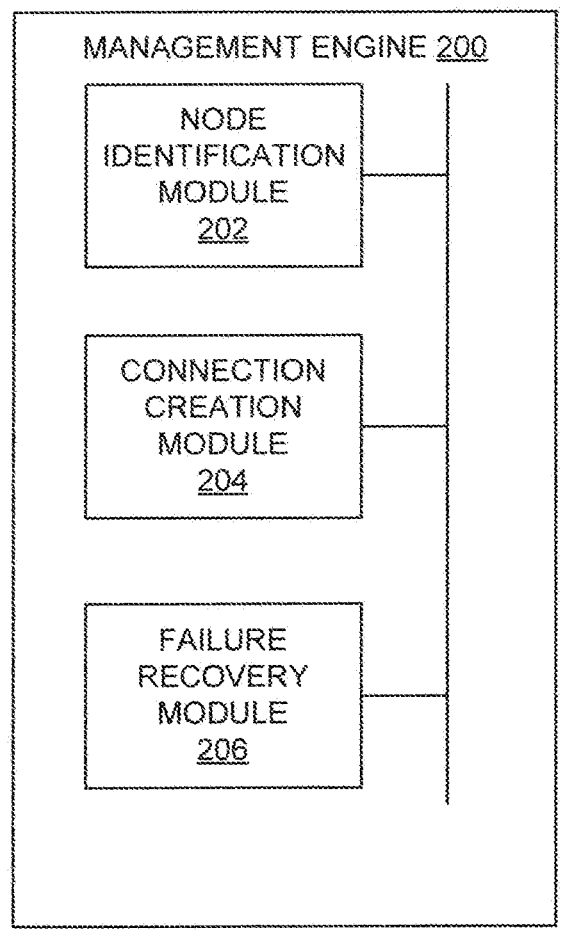
FIG. 2 is a block diagram of an example management engine, according to various embodiments.

FIG. 2 is a block diagram of an example management engine 200, according to various embodiments. The management engine 200 may be implemented as part of, or separate from, a Hadoop Distributed File System (HDFS). The management system 200 manages generation of a daisy chain distribution, including the management of failed nodes.

A node identification module 202 is configured to identify a plurality of data nodes (i.e., more than two) that will receive a particular file as part of a distribution of the file within the data center. The file may be initially stored at, for example, the seeder data node 104. The identified data nodes may be data nodes A 106, B 108, C 110, . . . and N 112 or some subset thereof. In some instances, the particular file may be a "large file" (e.g. more than 30 gigabytes). The data nodes may be identified based on file size, operating system, network utilization metrics, memory space, or some other property specific to the data management system used in the HDFS or the Hadoop framework.

In some instances, the node identification module 202 may determine whether to distribute a file using a particular technique of a plurality of available techniques. Available techniques include, but are not limited to, daisy chain distribution, HTTP, and BitTorrent distribution. The determination may be based on a number of nodes to which the file is to be distributed. For a small number of nodes, HTTP distribution may be favored while for a large number of nodes, BitTorrent may be favored. Another factor may be the availability of specialized hardware. For example, HTTP techniques require a hosting server; BitTorrent techniques require Seeders and Trackers; and the daisy chain technique only requires a seeder data node during recovery. Another consideration may be overhead. For example, BitTorrent techniques require overhead to generate torrents and initiate seeding over a period of minutes. In contrast, the daisy chain technique may require a few milliseconds to create TCP connections between data nodes. Scalability may be another factor in selecting a distribution technique. For example, HTTP techniques are not scalable and BitTorrent techniques are scalable but require additional Seeders and Trackers (e.g., overhead). The daisy chain technique is more scalable because there is a reduced dependence on the seeder data node. Other considerations may include failure handling and recovery, slow node handling, flow control, and error detection.

If the daisy chain technique is used, the node identification module 202 may further determine an order in which the identified data nodes are connected. The order determination may be based on various factors such as network utilization metrics, memory usage, and machine-specific properties of each data node.

A connection creation module 204 is configured to generate TCP connections between a seeder data node (e.g., seeder data node 104) storing a copy of the file to be distributed and the data nodes that will store copies of the file to be distributed in a daisy chain formation. A daisy chain formation is a serial arrangement of the data nodes in a specified order. The connection creation module 204 forms two TCP connections to each data node: an incoming connection connecting the data node to the data node from which the file is received and an outgoing TCP connection to the data node to which the data node is transmitting the file. A seeder data node, which stores the first copy of the file, has only an outgoing connection to the next data node in the daisy chain. Similarly, a terminal data node of the daisy chain has only an incoming connection because there are no further data nodes to which to distribute the file.

In some embodiments, each data node acts as a T-junction, simultaneously saving the file to disk and forwarding the previous block to the next data node in the chain. In operation, the file may be divided into one or more blocks, segments, or packets that are transmitted in order between the data nodes in the daisy chain. During a round of transmission, each data node receives a next block of the file from a previous data node in the daisy chain and transmits a previous block of the file to a next data node in the daisy chain.

A failure recovery module 206 is configured to detect whether a data node has failed or is otherwise offline and to perform one or more corrective actions based on the same. The failure recovery module 206 may determine that a particular data node has failed based on non-receipt of an acknowledgement message from the data node. In TCP connections, receiving nodes respond to a received block of data by sending an acknowledgment message to the sender of the block of data. If a data node has sent a block of data but has not received an acknowledgment message from the receiving data node, the receiving data node may have failed. A failed data node has not received the block of data and does not transmit the block of data to the next data node in the data chain.

When a data node has failed, the failure recovery module 206 instructs the data node that immediately precedes the failed data node in the daisy chain to form a "leapfrog" TCP connection with the data node immediately following the failed data node and initiate a handshake protocol. Using the handshake protocol, the preceding data node identifies blocks of data not yet received by the following data node. The preceding data node re-transmits the missing blocks of data to the following data node and resumes the daisy chain transmission.

For the failed data nodes that have been "leapfrogged" during the daisy chain transmission, recovery is re-started when the failed data nodes are back online. In some instances, the recovery may fall back to an HTTP or BitTorrent protocol after the daisy chain transmission is complete. In other instances, the failed data node may be added to the daisy chain by forming a TCP connection with the terminal data node of the daisy chain.

Flow control of data in the daisy chain may be implemented as a policy in the first data node in the chain. Since the first data node reads data from the source, it can control the rate at which data is read and thus, control the rate at which data flows in the chain. Slow nodes in the chain may be detected by the management engine in the node before the slow node by examining its buffer size. For slow nodes, recovery may be handled in the same way as failed data nodes.

Figure 3:
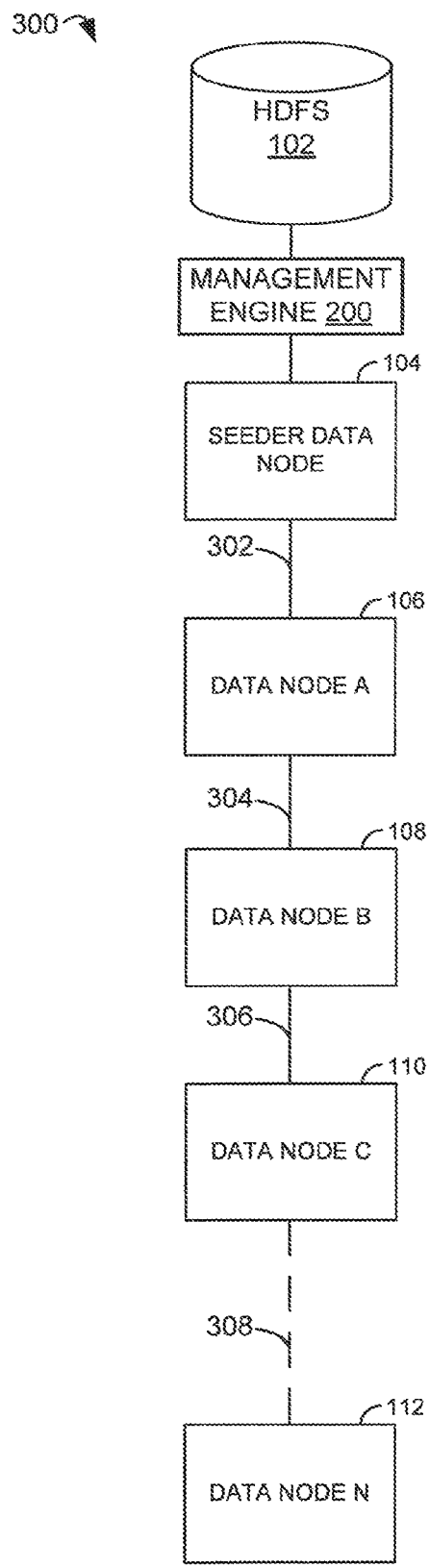
FIG. 3 is a network diagram within which a file may be distributed according to an example embodiment.

FIG. 3 is a network diagram 300 within which a file may be distributed according to an example embodiment. In the diagram 300, an HDFS 102 is in electronic communication with the management engine 200. The management engine 200 may be separate from the HDFS 102, partially integrated into the HDFS 102, or included in the HDFS 102. The network further includes a plurality of data nodes that are expected to store a file (e.g., seeder data node 104, data node A 106, data node B 108, and data node C 110 through to data node N 112). The management engine 200 is depicted as being connected to only the seeder data node 104 of the data nodes. However, in various embodiments, all or a portion of the data nodes may have a direct or indirect connection to the management engine 200. In some instances, the file may be provided by the HDFS 102 to a first data node, referred to as the seeder data node 104, or may be received by the seeder data node 104 from another source.

To form the daisy chain, TCP connections are formed between the data nodes to form a sequential chain of the data nodes. As depicted, a connection 302 is formed between the seeder data node 104 and data node A 104. Another connection 304 is formed between data node A 106 and data node B 108. A third data connection 306 is formed between data node B 108 and data node C 110. Additional connections 308 may be formed with further data nodes until a terminal data node, data node N 112 is connected at the end of the daisy chain. In operation, large files are streamed sequentially, one block at a time, from the seeder node 104 to the terminal data node N 112. Each data node can act as a 'T' junction, simultaneously saving the next block to disk and forwarding the previous block to the next node in the daisy chain.

Figure 4:
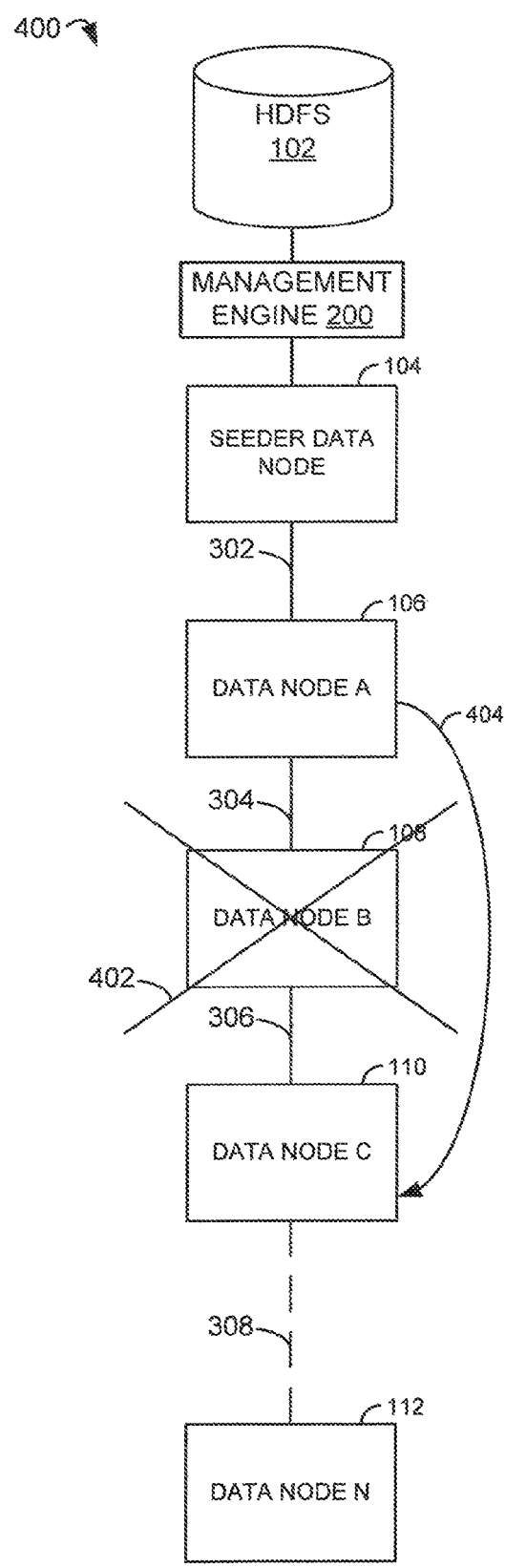
FIG. 4 is a network diagram in an example embodiment where a data node has failed.

FIG. 4 is a network diagram 400 in an example embodiment where data node B 108 has failed, indicated by "X" 402. When data node B fails, the preceding data node, data node A 106, fails to receive an acknowledgement message. Data node A 106 then forms a TCP connection 404 with the following data node, data node C110. Data node begins the recovery process by initiating a handshake protocol to identify the blocks of data that have not yet been received by the following data node, data node C 110.

Figure 5:
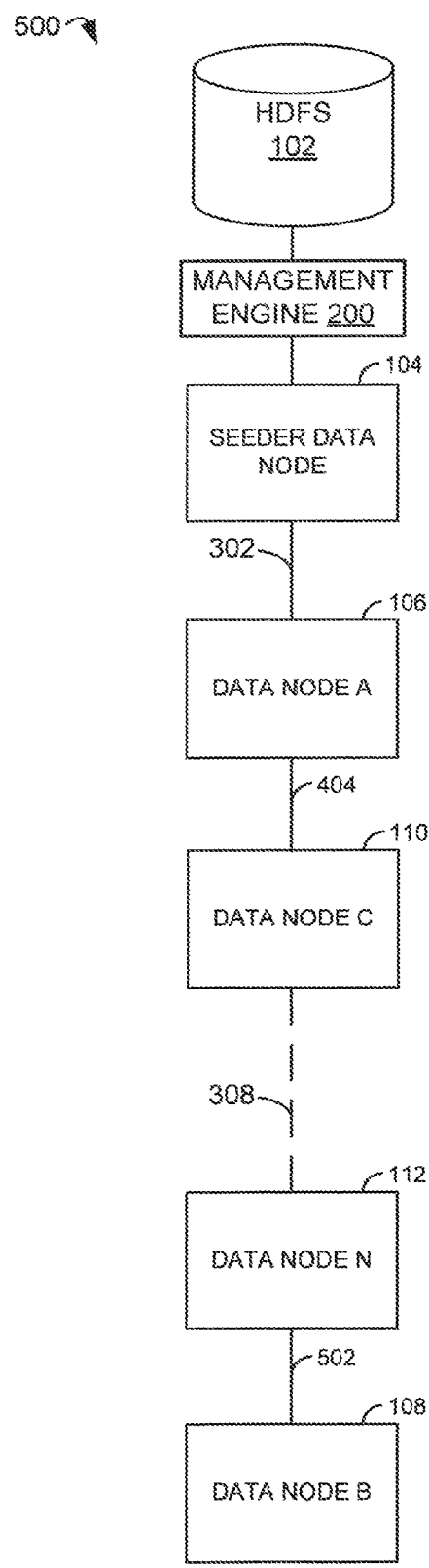
FIG. 5 is a further network diagram in the example embodiment where a data node has failed.

FIG. 5 is a further network diagram 500 in the example embodiment where the data node B 108 has failed. Data node B 108 may come back online before the daisy chain transmission is complete. In these instances, the failed data node may rejoin the daisy chain at the terminal data node N 112 by forming a TCP connection 502 with the terminal data node N 112, thus becoming the terminal data node of the daisy chain. Using the handshake protocol, the data node B may receive missing blocks of data from the data node N 112.

Figure 6:
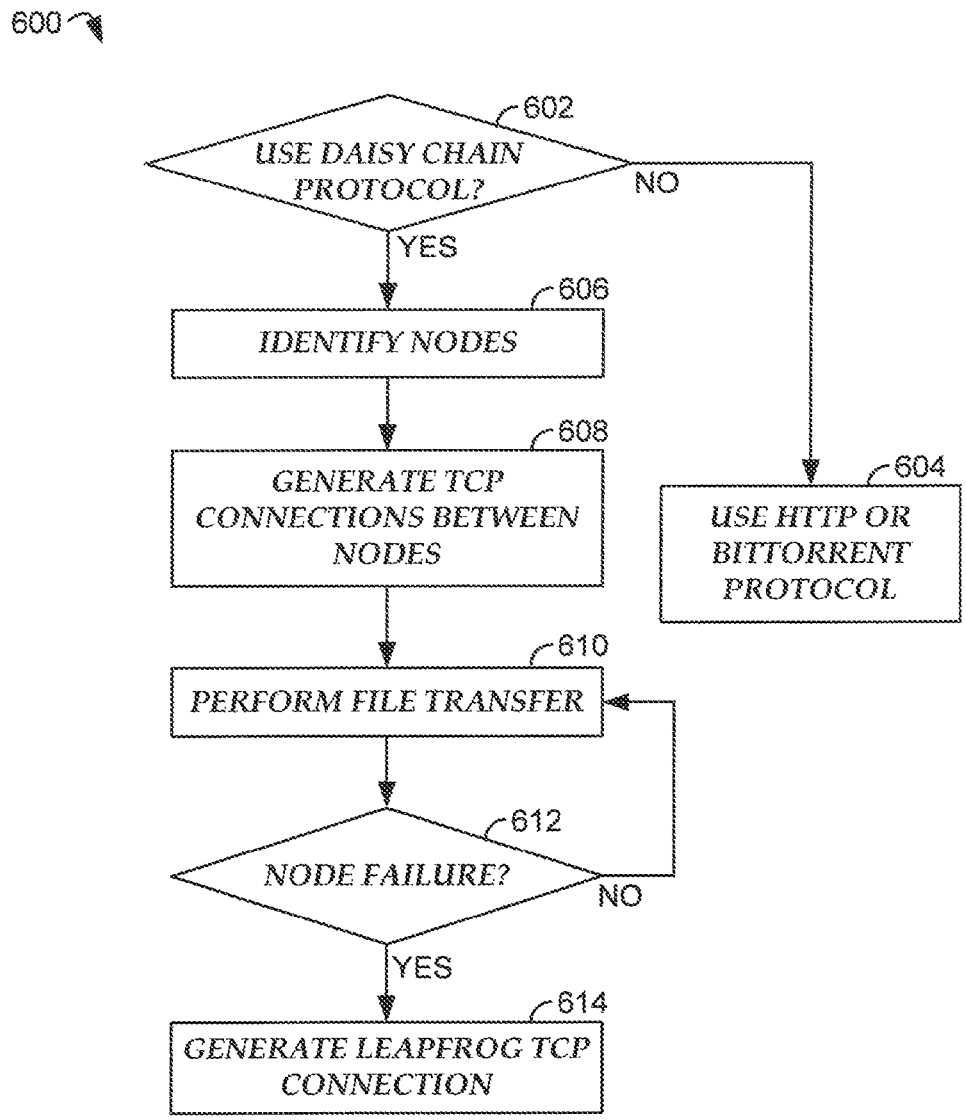
FIG. 6 is a flowchart illustrating an example method, according to various embodiments.

FIG. 6 is a flowchart illustrating an example method 600, according to various embodiments. The method 600 may be performed, in whole or in part, by the management engine 200. The method 600 begins by determining whether to use the daisy chain protocol in an operation 602. The operation 602 may be performed by the HDFS 102. If the determination is to not use the daisy chain protocol, the method proceeds to operation 604 where the HTTP or BitTorrent protocol is used to distribute the file.

If the determination is made to use the daisy chain protocol in operation 602, the data nodes to receive the data file are identified in an operation 606. Next, TCP connections are generated between the identified nodes to form a daisy chain in an operation 608. In an operation 610, the file transfer is performed according to the daisy chain protocol. In an operation 612, a determination may be made that a node has failed. If a node has failed, a leapfrog TCP connection is formed in an operation 614. If no nodes have failed, the method continues with operation 612 until the file is distributed to the data nodes within the daisy chain.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
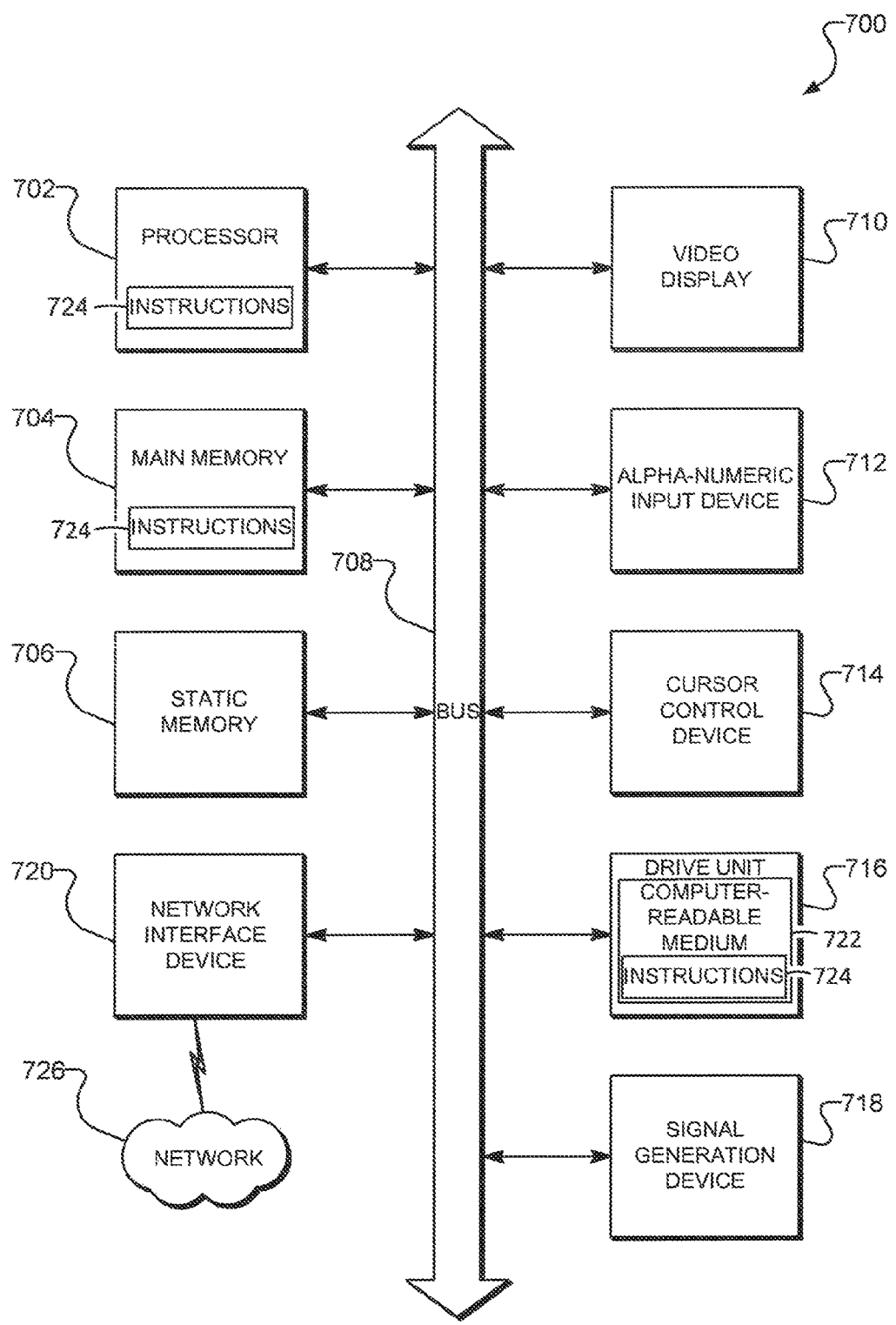
FIG. 7 is a diagrammatic representation of machine in the example form of a computer system within which a set of instructions, for causing the machine to perform any one or more of the methodologies discussed herein, may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more processors;
   a connection creation module configured to, using the one or more processors, instruct three or more data nodes to create communication connections between the three or more data nodes, the communication connections configured to transmit a data file across the three or more data nodes beginning at a seeder data node of the three or more data nodes and ending at a terminal data node of the three or more data nodes; and
   a recovery module configured to instruct a data node of the three or more data nodes that immediately precedes a failed data node detected in the three or more data nodes to form a leapfrog connection with a data node of the three or more data nodes immediately following the failed data node and to instruct the terminal data node to form a communication connection with the failed data node so that the failed data node becomes a new terminal data node of the three or more data nodes;
   the recovery module further configured to detect that the failed data node has failed based on non-receipt of a message from the failed data node, the message acknowledging receipt of the transmitted data file by the failed data node.

2. The system of claim 1, wherein the connection creation module is further configured to determine that the data file is stored at the seeder data node.

3. The system of claim 1, wherein the connection creation module is further to determine to transmit the data file using a particular technique.

4. The system of claim 3, wherein the particular technique is a hypertext transmission protocol (HTTP) or a BitTorrent protocol.

5. The system of claim 1, wherein the connection creation module is further configured to determine an order in which the three or more nodes are communicatively connected for transmission of the data file.

6. The system of claim 1, wherein the three or more data nodes are connected in a serial arrangement.

7. The system of claim 1, wherein each data node of the three or more data nodes comprises an incoming communication connection and an outgoing communication connection.

8. The system of claim 1, wherein each data node is configured to simultaneously save the data file to disk and to forward the data file to a next data node of the three or more data nodes.

9. The system of claim 1, wherein the data file is divided into one or more blocks that are transmitted in order between the three or more data nodes.

10. The system of claim 1, wherein the communication connections comprise transmission control protocol (TCP) connections.

11. The system of claim 1, wherein the failure recovery module is further configured to instruct the data node that immediately precedes the failed data node to initiate a handshake protocol with the data node immediately following the failed data node.

12. The system of claim 1, wherein the failure recovery module is further configured to cause the data file to be transmitted to the failed data node using an HTTP or BitTorrent protocol.

13. The system of claim 1, wherein the data file is managed by a Hadoop Distributed file System (HDFS).

14. A method comprising:
    creating communication connections between three or more data nodes, the communication connections configured to transmit a data file across the three or more data nodes beginning at a seeder data node of the three or more data nodes and ending at a terminal data node of the three or more data nodes; and
    instructing a data node of the three or more data nodes that immediately precedes a failed data node detected in the three or more data nodes to form a leapfrog connection with a data node of the three or more data nodes immediately following the failed data node and to instruct the terminal data node to form a communication connection with the failed data node so that the failed data node becomes a new terminal data node of the three or more data nodes;
    detecting that the failed data node has failed based on non-receipt of a message from the failed data node, the message acknowledging receipt of the transmitted data file by the failed data node.

15. The method of claim 14, further comprising determining an order in which the three or more nodes are communicatively connected for transmission of the data file.

16. The method of claim 14, further comprising instructing each data node of the three or more data nodes to simultaneously save the data file to disk and to forward the data file to a next data node of the three or more data nodes.

17. The method of claim 14, further comprising instructing the data node that immediately precedes the failed data node to initiate a handshake protocol with the data node immediately following the failed data node.

18. A non-transitory machine-readable medium having instructions embodied thereon, the instructions executable by one or more machines to perform operations comprising:
    creating communication connections between three or more data nodes, the communication connections configured to transmit a data file across the three or more data nodes beginning at a seeder data node of the three or more data nodes and ending at a terminal data node of the three or more data nodes; and
    instructing a data node of the three or more data nodes that immediately precedes a failed data node detected in the three or more data nodes to form a leapfrog connection with a data node of the three or more data nodes immediately following the failed data node and to instruct the terminal data node to form a communication connection with the failed data node so that the failed data node becomes a new terminal data node of the three or more data nodes;

detecting that the failed data node has failed based on non-receipt of a message from the failed data node, the message acknowledging receipt of the transmitted data file by the failed data node.

* * * * *